2,730,485

SEPARATING OIL-WAX MIXTURES

James M. Robertson, Kingsville, and Jack L. Little, Port Arthur, Tex., assignors to The Texas Company, New York, N. Y., a corporation of Delaware No Drawing. Application January 9, 1953,
Serial No. 330,582

9 Claims. (Cl. 196—18)

The present invention relates to the treatment of a mixture of oil and waxy material to separate and recover the waxes and liquid oil as respective products. More particularly, it contemplates separating wax and wax-like solids from liquid oil-wax mixtures with the aid of a solvent liquid.

In accordance with the present invention the wax-oil mixture is diluted with a mixed solvent comprising a chlorinated acetal, advantageously a chlorinated diethoxyethane containing an added oil solvent in such proportion that the resulting solvent mixture has essentially complete solvent action on the liquid hydrocarbons, thereby avoiding the liquid phase separation which tends to be effected by the chlorinated acetal, per se. In particular, the amount of oil solvent is sufficient to effect substantially complete solution of the liquid hydrocarbons at dewaxing temperatures, for example, temperatures of 20° F. and below and typically temperatures of +10 down to —30° F. At such temperatures the solid hydrocarbons are precipitated and may be separated to yield substantially oil-free wax and a solvent-oil mixture containing a lubricating oil of low cold test.

As above intimated, the chlorinated acetals particularly contemplated are the 1,1-dialkoxy halogenated ethanes, in which the alkoxy groups are preferably either methoxy or ethoxy. The ethane group is either mono-, di-, or tri-halogenated.

Therefore, the preferred class of primary solvents intended are halogenated acetals of the following structural formula:

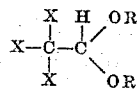

where X is hydrogen or halogen, at least one being halogen, and R is methyl or ethyl.

The oil solvent constituents of the final solvent mixture particularly contemplated are the aromatic hydrocarbons containing not more than 8 carbon atoms, as, for example, benzene, toluene and xylene.

The oil solvent may be present in amounts ordinarily ranging from about 5 to 40% of the chlorinated acetal, in which range it becomes effective to overcome the tendency towards oil phase separation and thereby enable separation of the liquid oil as a single homogeneous phase dissolved in the solvent mixture leaving the precipitated wax as an essentially oil free product.

The present invention is of particular advantage from the standpoint of realizing separated oils having a pour point equal to or below the separation temperature. The present solvent, therefore, offers a valuable advantage over other dewaxing solvents which yield an oil having a pour point materially above the separation temperature.

This differential between the dewaxing temperature and pour point, manifestly reflects a substantial economic disadvantage from the standpoint of the cooling or refrigeration required in order to realize an oil of any predetermined low cold test, and, accordingly, a saving for the present process insofar as the separation may be effected with materially less refrigeration to produce an oil of the same cold test.

The present invention is believed particularly surprising inasmuch as it has been previously proposed in U. S. Patent 2,091,400 to employ acetals for selective solvent extraction of liquid naphthenic constituents from liquid oils. This proposal, therefore, relies upon the fact that the chlorinated acetals inherently bring about an effective phase separation between the more naphthenic and more paraffinic liquids of the oil which, upon recovery, yield respectively a high VI raffinate and a naphthenic extract.

The present invention, however, contemplates avoiding liquid oil separation, and thereby results in a low viscosity, homogeneous oil solvent liquid phase which separates readily to yield a wax cake substantially free from oil. This is accomplished by virtue of the present solvent mixture which retains its homogeneity and complete miscibility with the liquid hydrocarbon constituents of the mineral oil at temperatures below 20° F. and particularly below 0° F. with substantially no solvent action upon the solid hydrocarbons or waxes.

Thus in dewaxing a lubricating distillate fraction a substantial amount of solvent mixture is added at ordinary temperature, or at a somewhat higher temperature if desired, to promote intimate initial contacting and mixing. The resulting mixture is then chilled to a temperature corresponding to, or slightly higher than, the desired pour test of the product, dewaxed oil. At the ensuing tempertaure, the wax is precipitated as wax crystals, which, by reason of the relatively high density of the solvent, readily float to the surface. Separation of the crystalline wax from the oil-solvent mix is carried out, for example, by filtration with the entire mass maintained at the chilling temperature. For example, by chilling and separating at a temperature of about 0° F., the resulting lubricating oil normally has a pour test of 0° F. or lower.

The amount of dilution, depending upon the stock treated, usually varies from about 1 to 10 parts, by volume, of solvent per volume of feed oil.

It is frequently advantageous to include in the solvent minor proportions of a wax anti-solvent, such as methyl ethyl ketone, acetone, furfural, etc. to improve the cake wax crystal formation and enable realization of increased filter rates. The wax anti-solvent constituent is ordinarily effective in concentrations of, for example, 5–40 and preferably 10–30% by volume on the basis of the chlorinated acetal in situations where higher filter rates are desired.

While separation of the solvent oil material from the wax crystals has been previously referred to in terms of filtration, other separation methods may be followed, as for example, centrifugal separation, floatation or the like. Actually, as above indicated, the halogenated acetals are in general characterized by a relatively high density, as a result of which the wax crystals formed, readily separate as a layer on top of the solution. For this reason, the process is particularly adapted to separation of the wax and oil-solvent phases by a floatation process involving continuous withdrawal of the wax from the supernatant wax crystal layer with bottom draw off of the oil-solvent mixture. The wax layer may be withdrawn continuously by scrapers or solid conveyors to a separate vessel and washed with additional solvent.

In any event, the recovered wax cake may be washed with an additional amount of the same or any desired different solvent which is subsequently recovered from both the wax and the residual liquid oil by stripping or otherwise. For example, the oil may be steam stripped or separated from the solvent by fractionation.

Referring now to one actual example of operation, one volume of a filtered wax distillate, having a gravity of 32.3° A. P. I. and a pour of 85° F., was mixed with 3 volumes of a solvent comprising 80 parts by volume of 2,2-dichloro-1,1-diethoxyethane and 20 parts by volume of toluene. The mixture was chilled and filtered at about 22° F., yielding 52% of slack wax and a separated oil having a pour point approximating the separation temperature.

In accordance with another example otherwise identical with the foregoing, the solvent-oil mix is chilled to, and filtered at, 0° F., yielding an oil having a pour point of 0° F.

Essentially comparable results are realized, for example, when the acetal of the foregoing example is substituted by 2-chloro-1,1-diethoxyethane or 2-chloro-1,1-dimethoxyethane.

Moreover, as previously indicated, the filter rate and character of the wax crystals are frequently improved by inclusion of a wax anti-solvent such as methyl ethyl ketone.

In dewaxing at yet lower temperatures than those referred to in the above examples, it may be beneficial to increase somewhat the amount of the aromatic oil solvent, but as clearly shown the amount added in any event need not be more than that sufficient to confer upon the solvent mix the property of substantially complete miscibility with the liquid hydrocarbons. This is commonly realized by amounts of oil solvent not greater than 5-40% by volume of the acetal present.

While the use of the foregoing solvent mixture has been described in connection with dewaxing of an oil, nevertheless it will be apparent therefrom that it is equally applicable to other separations of oil and wax from mixtures thereof as in wax repulping, deoiling, or recrystallization, or in solvent fractionation of wax wherein solid waxy fractions are separated from adherent or otherwise associated liquid hydrocarbons.

It is contemplated that the solvent liquid mixture may be equally well employed with all of the various wax-bearing fractions of mineral oil as well as the distillate fractions above referred to. Actually it has particular application to mixed base hydrocarbons containing wax and especially those containing appreciable amounts of paraffinic or relatively non-naphthenic liquid hydrocarbons.

Obviously, many modifications and variations of the invention as hereinbefore set forth may be made without departing from the original spirit and scope thereof, and only such limitations should be imposed as are indicated in the appended claims.

We claim:

1. A method of separating a mineral oil containing liquid hydrocarbon constituents and waxy constituents into said respective constituents which comprises mixing the mineral oil with a substantial amount of a solvent mixture comprising a halogenated acetal selected from the group consisting of the 1,1-dialkoxy ethanes and an amount of an aromatic, hydrocarbon oil solvent containing not more than 8 carbon atoms per molecule sufficient to effect substantially complete miscibility of the mineral oil in said solvent mixture, chilling the resulting admixture to a temperature at which waxy constituents separate from the admixture in solid form while the liquid hydrocarbon oil constituents remain substantially completely dissolved in the solvent mixture and removing the solidified waxy constituents therefrom.

2. The method according to claim 1 wherein said acetal is a 1,1-dialkoxy chlorinated ethane.

3. The method according to claim 1 wherein said halogenated acetal comprises a halogenated acetal of the following structural formula:

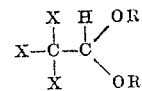

where X is selected from the group consisting of hydrogen and halogen, at least one being halogen, selected from the group consisting of methyl and ethyl.

4. The method according to claim 3 wherein the halogen is chlorine.

5. The method of claim 1 wherein said acetal comprises 2,2-dichloro-1,1-dimethoxyethane.

6. The method according to claim 1 wherein said solvent mixture added to the mineral oil contains a minor proportion of a wax antisolvent.

7. The method according to claim 1, wherein said solvent mixture added to the mineral oil contains a minor proportion of methyl ethyl ketone.

8. A method according to claim 1 wherein said halogenated acetal is 2,2-dichloro-1,1-diethoxyethane.

9. A method according to claim 1 wherein the amount of said aromatic, hydrocarbon oil solvent is present in said solvent mixture in an amount in the range 5-40 per cent by volume of said halogenated acetal and sufficient to effect substantially complete solution of the liquid hydrocarbon constituents of said mineral oil at a temperature of 20° F.

References Cited in the file of this patent

UNITED STATES PATENTS

| | | |
|---|---|---|
| 2,017,432 | Bahlke | Oct. 15, 1935 |
| 2,061,541 | Govers | Nov. 17, 1936 |
| 2,091,400 | Sullivan et al. | Aug. 31, 1937 |
| 2,349,038 | Goodson et al. | May 16, 1944 |